United States Patent [19]

Walker et al.

[11] Patent Number: 5,177,317
[45] Date of Patent: Jan. 5, 1993

[54] CABLE CUTTER ASSEMBLY

[75] Inventors: Stuart M. Walker, Guntersville; Clyde K. Luttrell, New Market, both of Ala.

[73] Assignee: Teledyne Industries, Inc., Los Angeles, Calif.

[21] Appl. No.: 818,541

[22] Filed: Jan. 9, 1992

[51] Int. Cl.$^5$ .......................... B26B 5/12; B64D 1/00
[52] U.S. Cl. .................... 89/1.14; 114/221 A
[58] Field of Search ...................... 89/1.14; 114/221 A

[56] References Cited

U.S. PATENT DOCUMENTS

| | | | |
|---|---|---|---|
| 745,526 | 12/1903 | Rogers | 114/221 R |
| 2,800,868 | 7/1957 | Temple | 89/1.14 |
| 2,924,147 | 2/1960 | Bohl et al. | 89/1.14 |
| 2,926,565 | 3/1960 | Thorness | 89/1.14 |
| 3,024,530 | 3/1962 | Haskell et al. | 89/1.14 |
| 3,320,669 | 5/1967 | Chandler et al. | 89/1.14 |
| 3,701,331 | 10/1972 | Harris, Jr. | 114/221 A |
| 3,763,738 | 10/1973 | Temple | 89/1.14 |
| 4,062,112 | 12/1977 | Lake | 89/1.14 |
| 4,493,240 | 1/1985 | Norton | 89/1.14 |
| 4,718,320 | 1/1988 | Brum | 244/1 TD |
| 4,852,455 | 8/1989 | Brum | 244/1 TD |

OTHER PUBLICATIONS

Illustration of Impulse, Mark 23 Mod O Cartridge and accomanying sheet of characteristics, Aug. 15, 1973.
Drawing sheet and exploded view of a cable cutter with the source of the drawing being Mine Safety Appliances Company (date unknown).
Technical Manual "Aerial Gunnery Target Set A/A3-7U-36".

Primary Examiner—David H. Brown
Attorney, Agent, or Firm—Beveridge, DeGrandi & Weilacher

[57] ABSTRACT

An explosive-type cable cutter assembly which includes a breech housing having a central passageway formed in it and a first slot extending from the exterior surface of the breech housing and opening into the passageway and a second slot extending from the exterior surface of the breech housing and opening into the passageway. The slots are each elongated in the direction of the central axis of the breech and each include a forwardmost edge and a rearwardmost edge. The cable cutting assembly also incldues a threadable plug with an impact wall positioned forward of the slots and radial ports extending from the exterior surface of the breech housing into the passageway between the impact wall and the slots. The cable cutter assembly further includes a piston cutter assembly having a piston cutter adapted for travel within the passageway in the breech housing. The piston cutter assembly includes an explosive cartridge with attached piston cutter. The piston cutter includes a cutting edge and a base end. The piston cutter has an axial length between the base end and the cutting edge which is less than the axial distance between the impact wall and the forwardmost edge of the slots and greater than the axial distance between the impact wall and the rearwardmost edge of the slots. The slots function both as a gas exhaust port and a cable receiving eyelet. The slots are also offset to angle the cable with respect to the piston cutter.

21 Claims, 3 Drawing Sheets

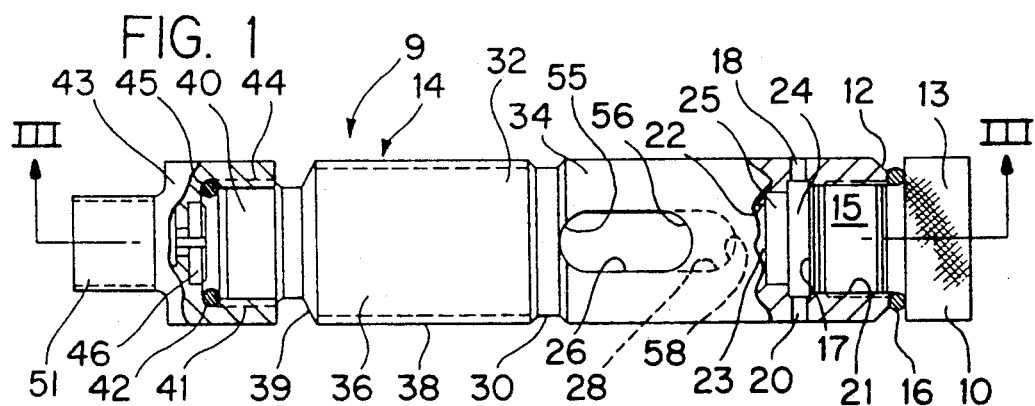
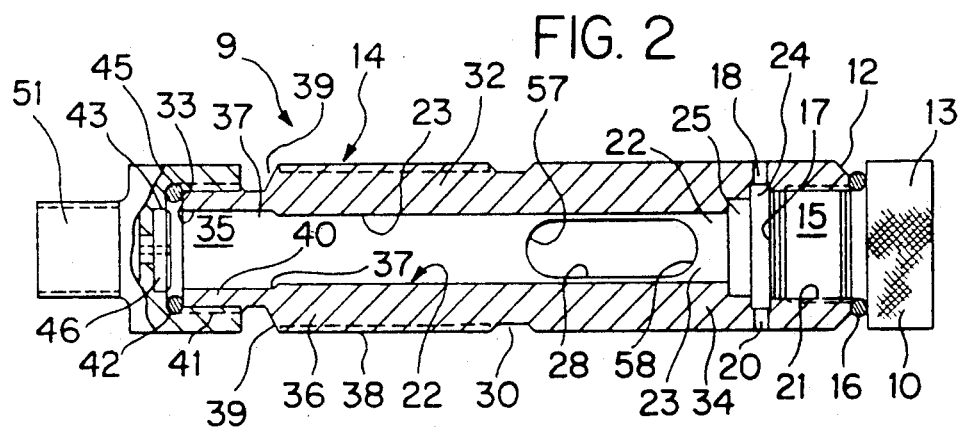
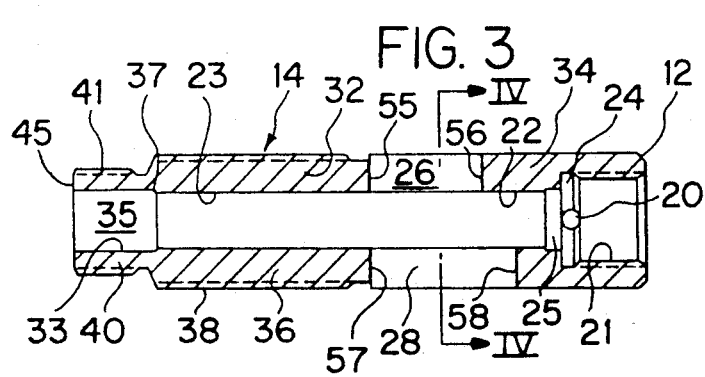
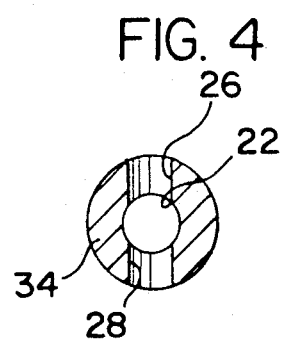
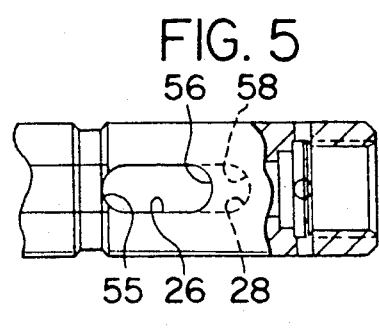
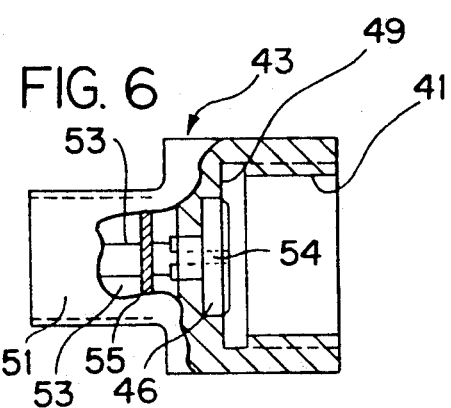

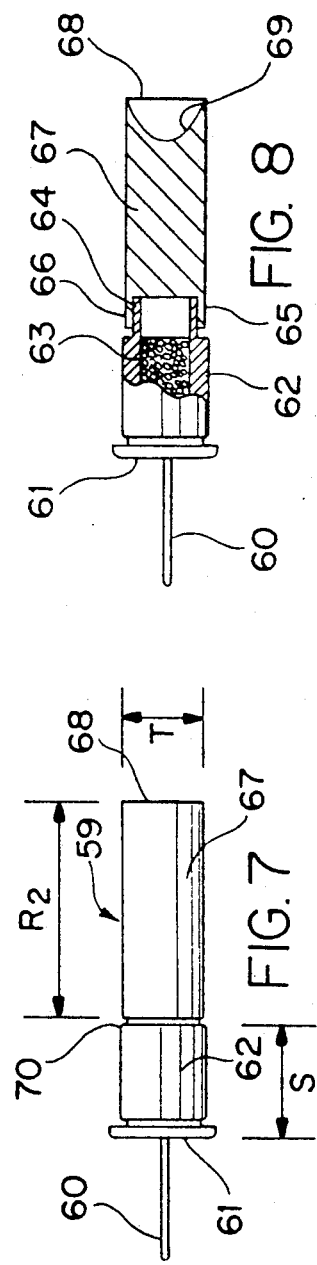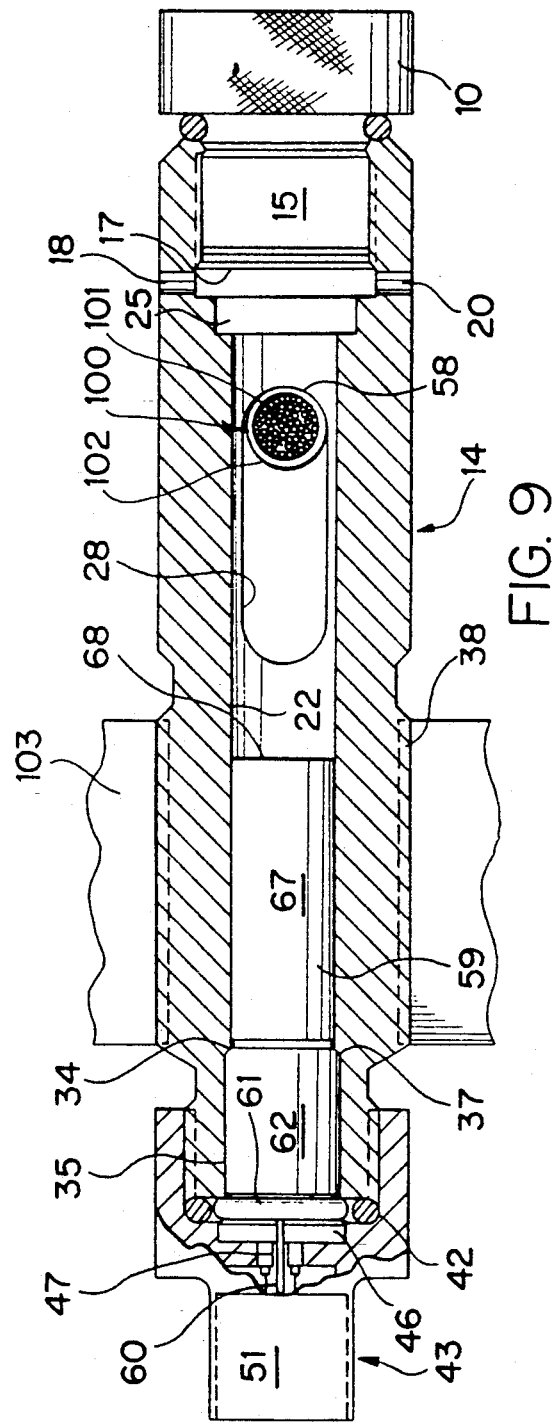

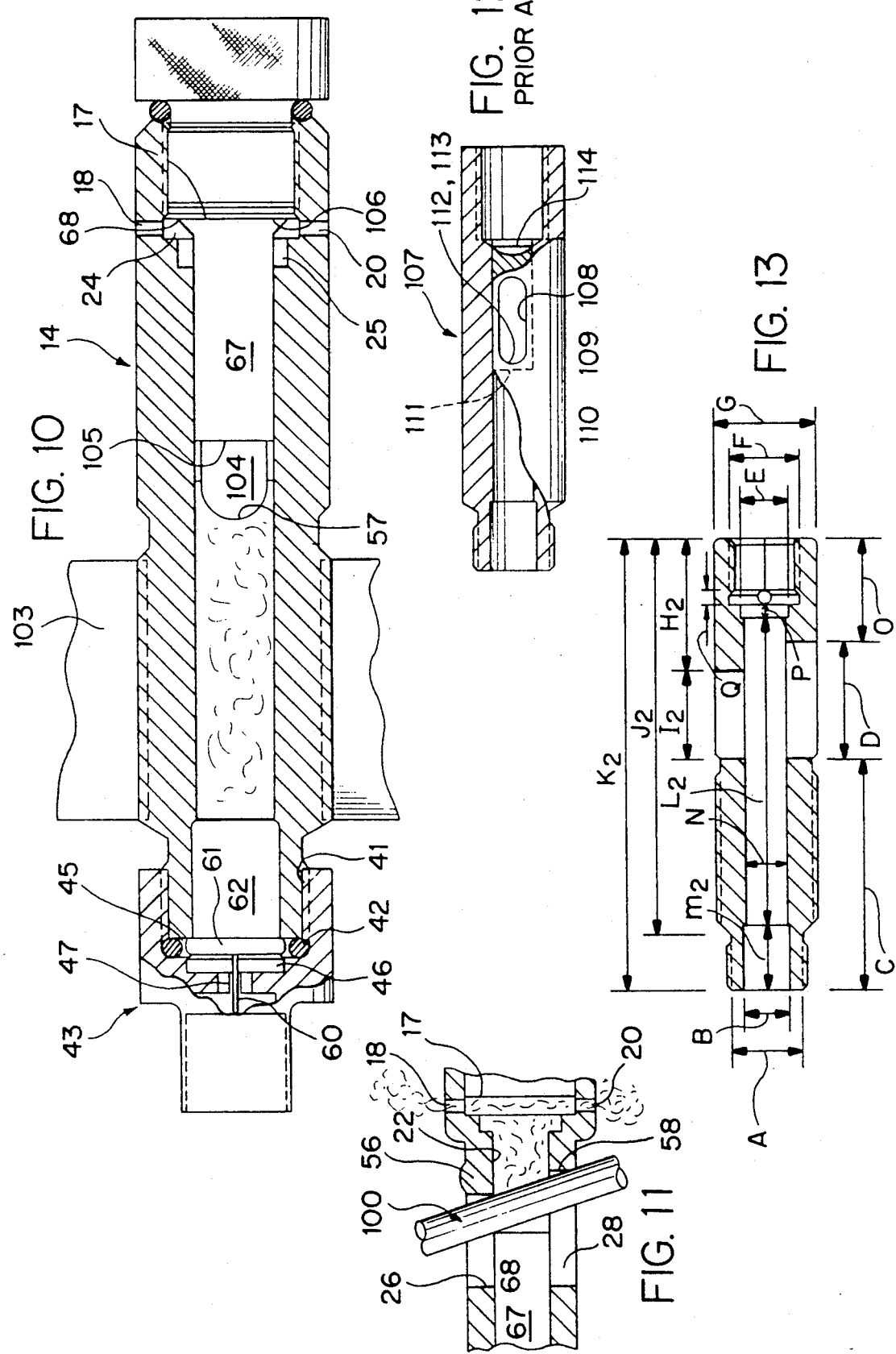

CABLE CUTTER ASSEMBLY

FIELD OF THE INVENTION

This invention relates to a cable cutter assembly. More particularly, this invention relates to an explosive cable cutting assembly which is particularly suited for use with an aerial gunnery target system.

BACKGROUND OF THE INVENTION

A variety of cable cutter systems for the purpose of cutting a cable or line. For example, U.S. Pat. No. 745,526 illustrates an early rope cutter system for cutting ropes used in Artesian well diggings. In U.S. Pat. No. 745,526, a weighted cutter housing is guided along the rope until reaching the rope's end socket whereupon a circular cutting edge cuts through the portion of the rope extending between a single aperture forming the guide and the centrally positioned rope end socket.

U.S. Pat. Nos. 3,320,669, 3,763,738 and 4,493,240 are illustrations of more recent explosive line cutting devices. U.S. Pat. No. 3,320,669 features a line cutting device for cutting control lines on parachutes when the supported load is expected to descend on a body of water. U.S. Pat. No. 3,320,669 includes a housing with end caps bolted thereto. The reference also includes a piston with a large diametered base, a sloping intermediate portion and a smaller diametered cylindrical projection. The housing includes a pair of opposing elongated slots through which the parachute line extends. Upon detonation of a charge forward of the base, the piston is driven such that the cylindrical projection cuts through the line and the shoulder portion of the piston contacts the intermediate portion of the passageway formed in the housing to stop piston movement. The chamber in which the base section travels includes a first radial vent and a second vent positioned further downstream just forward of the intermediate passageway. The first vent is for the exhausting of pyrotechnic gases and the second vent is for venting compressed gas in front of the piston's base section as it moves in the chamber.

U.S. Pat. No. 3,763,738 features a deep water explosive cutting tool which includes a yoke-like housing through which cables extend. The yoke includes guides for a spade-like cutter having a cylindrical rod received within a passageway formed in an outer housing. A charge is received within a bore formed at the free end of the cylindrical rod. Radial ports are provided behind a sealing ring surrounding the cylindrical rod so as to allow water to be introduced both in front of and behind the cutter for equalizing the high pressure experienced in the deep water environment.

U.S. Pat. No. 4,493,240 illustrates another explosive parachute line cutting device having a housing with a pair of diametrically opposed circular holes formed at one end through which a parachute line extends. An explosive charge system is positioned behind a blade with a circular cutting edge. At the end of the housing is positioned an annular anvil with a central aperture. The blade is forced forward so as to cut the parachute line and subsequently is stopped upon contacting the anvil. In this position, the blade's base is positioned forward of the holes and a large, unsealed chamber is provided rearward of the charge to allow for detonated gas exhaust.

An explosive cable cutter assembly designed for use with a towed aerial target is shown in U.S. Pat. Nos. 4,718,320 and 4,852,455. U.S. Pat. No. 4,852,455 shows a chisel-shaped cutter while U.S. Pat. No. 4,718,320 shows a clamping-type cutter assembly.

FIG. 12 of the present invention illustrates a previous embodiment utilized in pre-existing aerial gunnery target systems (e.g. AGTS Tow Reel, A/A 37U-36). The system shown in FIG. 12 features axially aligned elongated slots which provide for some play in the cable while being drawn in and out by a cable reeling system. The piston cutter of the explosive cartridge assembly illustrated in FIG. 12 is of an axial length which results in the blocking off of the elongated slots following detonation. Also, the breech assembly does not include an exhaust port for air positioned in front of the cartridge. Instead, any air that does not escape through the slots prior to passage of the cartridge is compressed in the chamber area forward of the travelling piston cutter.

The prior art explosive charge cable cutting systems suffer from various drawbacks including the failure to efficiently exhaust the gases produced upon detonation of the charge. For example, in some of the prior art embodiments, the resultant gases are exhausted out through the rear of the charge assembly which lowers the driving pressure on the cutter. The prior art also suffers from various problems such as detonation failures, inadequate or incomplete cutting of cables, the unavailability of some of the components for reuse, and difficultly in replacing components.

A failure of the cable cutter assembly to operate can be highly dangerous for pilots involved in aerial gunnery target testing as the pilot is forced to attempt a landing with the target still deployed. Since flight runs are very expensive and there typically is only a limited number of aerial gunnery targets available, it is also important that the aerial gunnery target system and the cable cutter assembly associated therewith be quickly readied for reuse following completion of a flight run. To minimize expense, it is also desirable to reuse as many of the original components of the cable cutter system as possible. The prior art systems are not well adapted for reuse and fast assembly.

SUMMARY OF THE INVENTION

The present invention provides a cable cutter assembly which avoids the above-noted deficiencies of the prior art. The present invention provides a cable cutter assembly which is highly reliable, is very efficient at cutting a cable, has reusable components, and is readily reassembled for reuse. The present invention is particularly suited for use as a component in a cable two reel assembly mounted on an aircraft. In such use, the cable cutter assembly provides a means to sever the tow cable when, due to a malfunctioning in the tow reel system, the deployed target or other object cannot be retracted and stowed for a safe landing.

In so doing, the present invention features a cable cutter assembly having a breech housing with a forward end, a rearward end, a central axis extending between the forward and the rearward end, and an external surface. The breech housing has a central passageway formed therein, extending in the direction of the central axis. The breech housing further includes a first slot extending from the exterior surface of the breech housing and opening into the central passageway. A second slot extends from the exterior surface of the breech housing and opens into the central passageway. The two elongated slots are essentially arranged in diametrically opposed fashion with respect to the essentially cylindrical shaped breech housing. The first and second slots have a forwardmost edge and a rearwardmost edge with the rearwardmost edge of the second slot being offset from the rearwardmost edge of the first slot in a direction along the central axis of the breech housing.

The cable cutter assembly also includes a piston cutter assembly having an explosive cartridge with piston cutter. The piston cutter is adapted for travel in the central passageway formed in the breech housing. The piston cutter preferably includes a cylindrical base and a cup-shaped forward end with a concave recess and a circular cutting edge. The shape of the cup-shaped end of the cartridge is such that there is no concern for alignment of the cutting edge which is a problem in some prior art embodiments.

The first and second slots are elongated and the first and second slots each have a forwardmost edge which is essentially equally spaced from the forward end of the breech assembly along the central axis of the breech assembly. Preferably, the first and second slots are elliptical in shape and the first slot has a major axis which is preferably about 0.20 to 0.30 of an inch longer than the major axis of the second slot.

The cable cutter assembly also includes a plug, and the rearward end of the breech housing includes means for engaging the plug. In a preferred embodiment, the plug is threaded into a threaded bore formed at the rear end of the breech housing and the plug includes a head member. A sealing ring is positioned between the head of the plug and the rearward end of the breech housing so as to form a seal when the plug is threaded into position. The threaded plug provides easy access to the piston cutter for the removal of the piston cutter prior to reuse of the breech housing. The forwardmost portion of the plug forms an impact wall against which the piston cutter impacts.

The breech housing includes at least one radial port and preferably two diametrically opposed radial ports. Each radial port is positioned between the plug and the rearwardmost edges of the slots, and each port extends from the exterior of the breech housing and opens into the central passageway. The central passageway includes a first passageway section and a second, larger diameter passageway section which is positioned rearward of the first passageway section. The radial port or ports open into the second, larger passageway section of the central passageway. The passageway includes a third passageway section which is positioned between the first and second passageway sections and has a larger diameter than the first passageway section and a smaller diameter than the second passageway section. The threaded bore which receives the plug has a diameter at the base of its threads which is essentially the same or slightly less than the diameter of the second passageway section.

The piston cutter has an axial length which is less than the axial distance between the forward end wall of the threaded plug (i.e., the impact wall) and the forwardmost edge of the slots. This arrangement provides an exhaust conduit between an aft end of the piston cutter and the forwardmost edge of the slots following a movement of the piston cutter to the rear end of the breech housing. Thus, the elongated slots function both to define the cable passageway and to allow for the exhaust of the gases produced by the detonation of the charge. This arrangement provides a good manner of exhausting the resultant detonation gases as the exhausting takes place immediately following the slicing of the cable and not prior to contact between the piston cutter and cable. Therefore, loss of detonation pressure is minimized.

The cable cutter assembly is particularly well suited for use in an aerial gunnery target system. The breech housing is secured to framework positioned rearward and below a cable guiding pulley. The cable extends from the guiding pulley and through the slots in the breech housing and through an exit location in the pod or housing for the reeling mechanism. The exit location, guiding pulley position and breech housing position are such that the cable when in a tensioned state slopes downwardly and rearwardly in a direction away from the cutter's edge. The cable cutter assembly described herein thus provides a means to sever a tow cable when, due to a malfunctioning in the tow reel system, the deployed target or other object cannot be retracted and stowed for a safe landing. The offset rearwardmost edges of the slots cause the tensioned cable of a reeling system to assume and maintain a position wherein it is inclined from the vertical in a forward to rearward direction. This arrangement provides a relatively more efficient (e.g., faster and cleaner) cutting of the cable as opposed to extending the tensioned cable perpendicularly with respect to the central axis of the cutting mechanism.

The second and third passageway sections are positioned just forward of the impact wall of the plug such that, following the piston cutter's impact against the impact wall, the piston cutter can be easily removed despite outward deformation in the cutting edge. The diameter of the threaded bore which receives the plug has a minimum diameter which is greater than the diameter of the first passageway section and also preferably greater than the diameter of the third passageway section. The second and third passageway sections also avoid galling on the inside surface of the passageway so that the breech can be reused many times. The position of the larger diameter second and third passageway sections is particularly useful in preventing galling of the passageway during rebound of the piston cutter following impact. The impact wall is preferably axially positioned at the rearward end of the second passageway section or somewhere along the axial length of the second passageway section.

The breech housing includes a cylindrical threaded projection extending off of a main body portion of the breech housing. The main body portion extends rearwardly from the projection to the rearwardmost end of the breech housing. The main body portion of the breech housing includes a threaded exterior section extending between the forwardmost ends of the slot and a declining shoulder portion which forms the base of the smaller diameter threaded projection. The threads on the exterior of the main body portion provide means for securement to supporting frame structure such as the framework of a reeling pod in an aerial gunnery target system.

The threaded projection is designed for engagement with a detonation cap. The detonation cap includes a cylindrical body with a threaded bore which threadably engages the projection which extends off of the forward end of the breech housing's main body portion. At the forward end of the cap's forward bore is positioned a sealing member (e.g. an O-ring) which seals the connection between the cap and projection. This sealed engagement is also complemented by the close tolerance between the projector in the cap so as to avoid any backflow of detonation gases out through the cap.

The detonation cap includes detonation means which comprises a detonator member axially positioned just forward of the seal member. The detonation member includes a small diameter central aperture for receiving the firing pin of the piston cutter's explosive cartridge. The firing pin extends from the forward end of the explosive cartridge base and is received within the central aperture of the detonation member. The cap includes an electrical connector at its forwardmost end which is sealed off to prevent leakage of exhaust gases through the central aperture. The electrical connector connects with an electrical line and an activation switch (not shown).

Upon activation of the switch, the electrical current triggers the detonation of the cartridge in a well known manner. Upon detonation of the explosive in the cartridge of the piston cutter assembly, the explosion causes the piston cutter with cutting edge to travel towards and through the sloping cable while the gas between the moving piston and impact wall is relatively moderately compressed and forced out the radial exhaust ports. The piston cutter travels down the central passageway and impacts the cable after travelling about 1⅛ of an inch. The detonation produces a pressure force of about 18 KPSI behind the piston. As the piston accelerates down the passageway, it develops sufficient kinetic energy to sever the cable. The gas pressure exerted on the piston aft end does not provide essentially any cutting force, but rather the kinetic energy is relied upon during cutting.

BRIEF DESCRIPTION OF THE DRAWINGS

The present invention will be more fully understood from the detailed description given herein below and the accompanying drawings which are given by way of illustration only, and thus are not, limitative of the present invention and wherein:

FIG. 1 illustrates a top, planar view of the present invention with end portions cut away for improved illustration;

FIG. 2 represents a cross-sectional, partially cut away view taken along the mid-portion of that which is shown in FIG. 1;

FIG. 3 is a cross-sectional view of the breech housing shown in FIG. 1 taken along line III—III;

FIG. 4 is a cross-sectional view taken along IV—IV in FIG. 3 of the entire periphery of the breech housing shown in FIG. 1;

FIG. 5 is a cut away view of that which is shown in FIG. 1 with the plug removed;

FIG. 6 illustrates a cut away view of the detonation cap shown in FIG. 1;

FIG. 7 shows a piston cutter assembly suitable for use in the present invention;

FIG. 8 shows a broken away view of that which is shown in FIG. 7;

FIG. 9 shows a cross-sectional view of the breech housing with the piston cutter assembly in a pre-detonation state as well as the positioning of the cable extending through the slots in the breech housing (one slot shown);

FIG. 10 shows that which is shown in FIG. 9 except for the piston cutter assembly being in a post-detonation state;

FIG. 11 shows a cut-away view of the present invention with the piston cutter making initial contact with the sloped cable and the exhausting of gas downstream from the piston cutter;

FIG. 12 shows a breech housing for a pre-existing cable cutter assembly; and

FIG. 13 shows a cross-sectional view like that shown in FIG. 3 with dimension lines A to O.

DETAILED DESCRIPTION OF THE PREFERRED EMBODIMENTS

FIG. 1 illustrates a top planar view of the present invention with cut away end portions. FIG. 2 presents a similar view of that which is shown in FIG. 1, except for breech housing 14 being shown in cross-section. With reference initially to FIGS. 1 and 2, cable cutter assembly 9 of the present invention includes rear end plug 10 threadably received within threaded bore 21 formed at the rear end 12 of breech housing 14. Sealing member 16 (e.g. an O-ring formed of neoprene rubber) is positioned between plug head 13 and rear end 12. Extending off of head 13 is threaded member 15. Threaded member 15 includes impact wall 17 at its forwardmost end and is threadably received within threaded bore 21. Just forward of impact wall 17 is positioned radial ports 18 and 20. Radial ports 18 and 20 open into central passageway 22 which includes first passageway section 23, second passageway section 24 and third passageway section 25. Radial ports 18 and 20 open directly into second passageway section 24 which is of a larger diameter than third passageway section 25 and first passageway section 23. Third passageway section 25 is of a larger diameter than the much longer first passageway section 23.

Breech housing 14 includes main body portion 32 which is comprised of rearward housing portion 34, ring shaped recess 30, and forward housing portion 36. Forward housing portion 36 has threads 38 formed on its exterior for securement to a supporting framework (e.g., 103 FIG. 10). Extending forwardly off the front end of main body 32 is projection 40. Projection 40 includes an inner wall surface 33 which defines reception chamber 35 which opens into the forward end of central passageway 23. Reception chamber 35 is of a slightly greater diameter than central passageway 23 and includes gently sloping end 37. Inclined wall 39 is positioned between the rearward end of projection 40 and the forward end of housing portion 36. Projection 40 includes threads 41 which threadably engage with threaded bore section 44 of detonation cap 43. Detonation cap 43 includes detonation member 46. When threads 41 of projection 40 are threadably received within threaded bore section 44, sealing member 42 is compressed between the forward end or rim 45 of projection 40 and interior wall 49 (see FIG. 6) of detonation cap 43. Sealing member 42 can take a form similar to sealing member 16. Sealing member 42, in combination with strict tolerance requirements (e.g. 0.001 to 0.003 of an inch) between the exterior surface of projection 40 and the interior surface of detonation cap 43 helps prevent any back leakage of the gases produced in an explosion described in greater detail below.

As shown in FIG. 6, detonation cap 43 includes electrical socket 51 extending for the forward portion of detonation cap 43. Electrical socket 51 includes a suitable electrical connection means such as pins or prongs 53 formed in sealing wall 55. Detonation member 46 includes pin aperture 54, the purpose for which is explained in greater detail below.

With reference now to FIGS. 1-5, slots 26 and 28 are formed as elliptical slots with slot 26 being shorter than slot 28 by at least 0.20 to 0.30 of an inch and more preferably about 0.25 of an inch. Breech housing 14 is preferably fixed to a suitable framework structure through threads 38 being threaded into an appropriate threaded bore in a structural framework (e.g. 103, FIG. 9). When fixed in position, shorter elongated slot 26 is preferably the upper surface of the breech housing which is positioned rearward and below a cable source, such as a cable guiding pulley positioned above breech housing 14. Slot 28 is positioned diametrically opposed to slot 26 and extends further rearward than slot 26, such that a tensioned cable extending through both slots slopes in a downward and forward to rearward direction. Slot 26 includes forwardmost edge 55 and rearwardmost edge 56. Slot 28 includes forwardmost edge 57 and rearwardmost edge 58. The forwardmost and rearwardmost edges can have a smoothly curving wall extending from the exterior to the passageway to avoid sharp edge contact with the cable and alternately, suitable liners can be provided with the same shape of the elliptical slots.

FIG. 7 shows piston cutter assembly 59 with firing pin 60 extending from cover 61 of explosive casing 62 and piston cutter 67 extending from casing 62. Firing pin 60, casing 62 and cover 61 define an explosive cartridge. FIG. 8 shows a cut away view of that which is shown in FIG. 7. As shown in FIG. 8, explosive casing 62 includes detonation material 63 centrally positioned within casing 62. Casing 62 also include cylindrical projection 64 which is frictionally or adhesively secured within female reception port 66 of piston cutter 67 having cutting rim 68. Cutting rim 68 is circular and is defined by concave recess 69 extending inwardly into the cylindrical body of piston cutter 67. Various depths and sloping arrangements can be provided for surface 69 so as to provide the appropriate sharp edge rim 68. In a preferred embodiment, surface 69 essentially defines a hemispherical recess having a radius of 0.16 of an inch. Casing 62 has an external circumference which is slightly smaller (e.g. 0.001 of an inch smaller) than wall surface 33 defining reception chamber 35. An inwardly curved bead is provided at the rear end of casing 62 to correspond with curved surface 37. Piston cutter 67 has an external diameter which is slightly smaller (e.g. 0.003 of an inch smaller) than the surface defining passageway section 23. With this arrangement, piston cutter 67 is properly guided during its travel within passageway 22. The present invention also contemplates providing a sealing ring about the exterior circumference of the piston to form a seal between the piston cutter and passageway section 23. The seal can be formed of a low friction material so as to facilitate travel within the passageway.

A piston cutter assembly which is suitable for the purposes of the presents invention is an impulse cartridge manufactured by HAYES DIVERSIFIED TECHNOLOGIES of California. Extending forwardly off cover 61 of casing 62 is firing pin 60. Firing pin 60 is received within pin aperture 47 centrally positioned in detonation cap 43. Threads 38 are threadably received within framework structure 103 so as to properly orientate breech housing 14 with respect to cable 100 extending through slots 26 and 28. Cable 100 is typically comprised of steel filaments 101 surrounded by a protective and encompassing covering 102 formed of a material such as steel. Tension cable 100 is positioned in abutment with rearwardmost edge 58 of slot 28 and (although not shown) would also be in abutting relationship with rearwardmost edge 56 of slot 26. FIG. 9 illustrates the piston cutter assembly 59 in its pre-detonation state.

FIG. 10 illustrates piston cutter 67 following detonation of charge 63 in casing 62 and following the piston cutter's separation from casing 62 and passage through cable 100. As shown in FIG. 10, piston cutter 67, following slicing through the cable 100, impacts at its forward edge 68 against impact wall 17 so as create a deformed front edge 106. As shown in FIG. 10, passageway sections 24 and 25 are positioned just forward of the deformed front edge 106. Passageway sections 24 and 25 are of a greater diameter than the deformed front edge 106, thereby avoiding any galling on the interior surface of central passageway 22, especially on rebounding of piston cutter 67 after impacting wall 17. A portion of the cut off cable is retained within the recess formed in the recessed defined by surface 69 in piston cutter 67 and thus further scratching or galling by the cut edges of the segment of cable cut off by the cup-shaped rim is avoided.

Following impact, piston cutter 67 is easily removed as passageway section 24 and 25 prevent piston cutter 67 from being caught within the passageway and plug 10 can be easily unthreaded as to gain access to piston cutter 67. Moreover, detonation cap 43 can be unthreaded and a new piston cutter assembly 59 inserted in place of spent casing 62. The cap is then again threaded in place such that the cable cutting assembly is again ready for operation.

FIG. 10 also shows the positioning of aft end 105 of piston cutter 67 following impact with wall 17. In this position, aft end 105 is positioned rearwardly of forwardmost edge 57 and 55 of slots 26 and 28, respectively. Preferably, with the axial length between forward edge 57 and aft end 105 is about 0.20 to 0.22 of an inch. With such positioning of aft end 105, exhaust ports (one designated 104) are formed on diametrically opposing sides of breech housing 14 such that the exhaust gas resulting from the detonation of explosive charge 63 is exhausted after piston cutter 67 slices through cable 100 and immediately before impact and for a period following impact. Hence, slots 26 and 28 provide the dual function of exhausting the gases resulting from the explosion and providing an adaptable cable passageway.

Detonation is achieved by a suitable electrical signal being sent to detonation cap 43 whereupon the electrical energy is relayed to firing pin 60 so as to trigger the detonation of the explosive material 67 contained in casing 62. Upon detonation the resultant gases are directed forward so as to separate piston cutter 67 from casing 62 and propel it towards cable 100. Backflow of the resultant gases is avoided due to the close tolerance between casing 62 and reception chamber 35 and sealing member 42, as well as the threaded connection of projection 40 and threaded bore 41.

FIG. 11 shows piston cutter 67 in its initial contact with tension cable 100. As shown in FIG. 11, circular edge 68 of piston cutter 67 is essentially vertical while cable 100 is inclined with respect to the vertical such that cutting takes place in sequential fashion. Cable 100 is in contact with rearwardmost slot edges 56 and 58. The gases forward of impact wall 17 and rearward of piston edge 68 are relatively moderately compressed and then exhausted through radial ports 18 and 20. This prevents any appreciable slowing down of piston cutter 67 in traveling through cable 100. FIG. 12 shows a previously relied upon assembly with breech housing 107 and piston cutter 110 which includes diametrically opposed slots (one shown 108). The two diametrically opposed slots in FIG. 12 are of the same length and are not axially offset from one another such that a cable passing therethrough is not inclined with respect to the vertical. Also, piston cutter 110 used with breech housing 107 is depicted schematically in dashed lines. Aft end 111 of piston cutter 110 is illustrated in FIG. 12 to be forward of forwardmost end 112, 113 for slots 108 and 109 when cutting edge 114 of piston cutter 110 reaches its rearwardmost position. The exhaust gases produced by the detonation are retained at high pressure within the passageway forward of aft end 110. The high pressure gases are gradually exhausted through the back end of breech housing 107 due to a lack of close tolerances.

Although the present invention has been described with reference to a preferred embodiment, the invention is not limited to the details thereof. Various substitutions and odifications will occur to those of ordinary skill in the art and all such substitutions and modifications are intended to fall within the spirit and scope of the invention as defined in the appended claims.

What is claimed is:

1. A cable cutter assembly, comprising:
   a breech housing having a forward end, a rearward end, and an external surface, a central axis extends between said forward and rearward end, said breech housing having formed therein a passageway extending in the direction of the central axis, said breech housing further including a first slot extending from the exterior surface of said breech housing and opening into said passageway and a second slot extending from the exterior surface of said breech housing and opening into said passageway, said first slot having a rearwardmost edge and said second slot having a rearwardmost edge which is offset from the rearwardmost edge of said first slot in a direction along the central axis of said breech housing; and
   a piston cutter assembly which includes cutter adapted for travel in the passageway formed in said breech housing.

2. A cable cutter assembly as recited in claim 1, wherein said first and second slots are elongated in shape and said first slot has a major diameter which is at least 0.20 of an inch longer than that of said second slot.

3. A cable cutter assembly as recited in claim 1, wherein an impact wall is provided at the rearward end of said breech housing and said central passageway includes a first diameter section and a second, larger diameter section positioned rearward of the rearwardmost edges of said slots and forward of said impact wall.

4. A cable cutter assembly as recited in claim 1 wherein said piston cutter assembly includes a piston cutter with a cylindrical base and a cup-shaped forward end which defines a concave recess and a circular cutting edge.

5. A cable cutter assembly as recited in claim 1, wherein said first and second slots are elongated and said first and second slots each have a forwardmost edge which is essentially equally spaced from the forward end of said breech assembly along the central axis of said breech assembly.

6. A cable cutter assembly as recited in claim 5 wherein said first and second slots are elliptical in shape and said first slot has a major diameter which is at least 0.20 of an inch longer than that of said second slot.

7. A cable cutter assembly as recited in claim 1, further comprising a plug and the rearward end of said breech housing including means for engaging said plug, said plug including a forward end wall, and said piston cutter having an axial length which is less than the axial distance between said forward end wall of said plug and the forwardmost edge of said slots so as to provide an exhaust conduit between an aft end of said piston cutter and the forwardmost edge of said slots following a movement of said piston cutter to the rear end of said breech assembly.

8. A cable cutter assembly as recited in claim 7 wherein said piston cutter assembly includes a piston cutter with a cylindrical base and a cup-shaped forward end which defines a concave recess and a circular cutting edge.

9. A cable cutter assembly as recited in claim 1, further comprising a plug, sealing means, and a detonation cap, and wherein said passageway extends through said breech housing and the rearward end of said breech housing is releasably engaged with said plug and the forward end of said breech housing is releasably engaged with said detonation cap, and said sealing means being positioned between said breech housing and said detonation cap so as to prevent a leakage of gases between said breech housing and detonation cap.

10. A cable cutter assembly as recited in claim 9 wherein said detonation cap and said plug are threadably engaged with said breech housing.

11. A cable cutter assembly as recited in claim 9 further comprising a sealing member positioned between said plug and said breech housing.

12. A cable cutter assembly as recited in claim 1, further comprising a plug, and said rearward end of said breech housing including means for engaging said plug.

13. A cable cutter assembly as recited in claim 12, wherein said breech housing includes a radial port positioned between said plug and rearwardmost edges of said slots, and said port extending from the exterior of said breech housing and opening into said central passageway.

14. A cable cutter assembly as recited in claim 13, wherein said central passageway includes a first diameter section and a second, larger diameter section which is positioned rearward of said first diameter section, and said radial port opening into said second, larger diameter section of said central passageway.

15. A cable cutter assembly, comprising:
   a breech housing having a forward end, a rearward end, and an external surface, a central axis extends between said forward and rearward ends, said breech housing having formed therein a passageway extending in the direction of the central axis, said breech housing further including a first slot extending from the exterior surface of said breech housing and opening into said passageway and a second slot extending from the exterior surface of said breech housing and opening into said passageway, said slots each being elongated in the direction of said central axis and each including a forwardmost edge and a rearwardmost edge, said cable cutting assembly further including an impact wall positioned rearward of said slots and a radial port extending from the exterior surface of said breech housing into said passageway between said impact wall and said slots; and a piston cutter assembly having a piston cutter adapted for travel within the passageway in said breech housing, said piston cutter including a cutting edge and a base end, and said piston cutter having an axial length between said base end and said cutting edge which is less than the axial distance between said impact wall and the forwardmost edge of said slots and greater than the axial distance between said impact wall and the rearwardmost edge of said slots.

16. A cable cutter assembly as recited in claim 15 wherein said slots are elliptical in shape with one of said slots having a major axis of a length different than the other.

17. A cable cutter assembly as recited in claim 15 wherein said piston cutter assembly comprises an explosive cartridge assembly which includes a casing containing explosive material, said explosive cartridge assembly being releasably secured to the forward end of said breech housing and forward of said piston cutter when positioned in the passageway formed in said breech housing.

18. An assembly as recited in claim 15 wherein said piston cutter includes a concave recess with a rim section defining said cutting edge, and wherein said piston cutter and explosive charge assembly are secured to one another prior to detonation and adapted for separation following detonation of said explosive charge cartridge.

19. An assembly as recited in claim 15 wherein said first and second slots are essentially diametrically opposed and said first slot being axially offset from said second slot.

20. A cable cutter assembly as recited in claim 15 wherein said impact wall is defined by a forward wall of a plug member, said plug member being releasably secured to the rearward end of said breech housing.

21. A cable cutter assembly as recited in claim 20 wherein said piston cutter assembly comprises an explosive cartridge assembly which includes a casing containing explosive material, said explosive cartridge assembly being releasably secured to the forward end of said breech housing and forward of said piston cutter when positioned in the passageway formed in said breech housing.

* * * * *